United States Patent [19]

Fahner et al.

[11] Patent Number: 4,812,247

[45] Date of Patent: Mar. 14, 1989

[54] PLASTICS MOULDING CONTAINING REINFORCED FILLINGS

[75] Inventors: Karsten Fahner, Cologne; Friedrich Johannaber, Lohmar; Hans-Werner Depcik, Duesseldorf; Axel Kaminski, Wermelskirchen; Rüdiger Van Hooren, Krefeld, all of Fed. Rep. of Germany

[73] Assignee: Bayer Aktiengesellschaft, Leverkusen-Bayerwerk, Fed. Rep. of Germany

[21] Appl. No.: 895,164

[22] Filed: Aug. 11, 1986

Related U.S. Application Data

[63] Continuation of Ser. No. 601,440, Apr. 18, 1984, abandoned.

[30] Foreign Application Priority Data

Apr. 29, 1983 [DE] Fed. Rep. of Germany ....... 3315707

[51] Int. Cl.$^4$ ................................................. A01B 1/06
[52] U.S. Cl. ..................................... 252/511; 252/512; 252/518; 252/521; 252/500; 264/328.18; 264/104; 264/105; 524/496; 428/367; 428/401; 428/439; 428/452

[58] Field of Search .................... 264/328.18, 104, 105; 252/511, 500, 512, 278, 521; 524/495, 496, 401, 439, 443, 452, 612, ; 428/323, 327, 330, 364, 367

[56] References Cited

U.S. PATENT DOCUMENTS

| | | | |
|---|---|---|---|
| 4,060,226 | 11/1977 | Schwellen | 425/208 |
| 4,074,362 | 2/1978 | Krudey et al. | 425/208 |
| 4,564,491 | 1/1986 | Koestechi | 264/328.8 |
| 4,585,850 | 4/1986 | Dominquez | 264/328.1 |

FOREIGN PATENT DOCUMENTS

| | | |
|---|---|---|
| 4534269 | 8/1964 | Japan . |
| 150475 | 5/1978 | Japan . |

Primary Examiner—Josephine Barr
Attorney, Agent, or Firm—Connolly and Hutz

[57] ABSTRACT

By means of a piston-like movement, solid fillings, for example of mineral fibers or steel wool, introduced in the pressureless zone of a screw are incorporated in the molten plastic and the resulting mixture formed in a mold. The finished molding contains numerous fillings greater than 2 mm in length which inter alia contribute significantly towards improving its strength.

3 Claims, No Drawings

PLASTICS MOULDING CONTAINING REINFORCED FILLINGS

This is a continuation of application Ser. No. 601,440, filed Apr. 18, 1984, abandoned.

This invention relates to a process, an apparatus and an injection molded part of plastic containing solid fillings having a minimum length of greater than 4 mm and, more particularly, greater than 8 mm, in which the fillings are introduced into a screw in a region, where the plastic is in a plasticized form and the pressures are nearly the same, and are then incoporated by shearing.

It is possible through incorporation of solid fillings, particularly glass fibers, significantly to improve the strength properties of plastic products, enabling them to be used for a wider range of applications. If, in addition, these materials, for example of metal, are conductive, it is also possible to obtain an electromagnetic screening effect so that, insensitive electronic installations, moldings of the type in question—in addition to the generally necessary protection by encapsulation—can also perform a screening function against environmental interference.

In one known process, plastics granulate and filling material are separately introduced into a standard injection molding machine from the rear feed hopper to produce a reinforced plastics molding.

The disadvantage of this process lies in the fact that the fillings, which are generally brittle, give rise to economically intolerable wear of those parts of the machine with which they come into contact, which at the same time results in a considerable reduction in the size of the fillings, with the result that, despite the addition of long glass fibers, the fillings ultimately present in the finished molding have lengths of, on average, less than 0.5 mm. On account of these disadvantages, this process is hardly ever used in practice.

Extruders in which the screw has a continuous transporting effect are also known. In their case, glass fibers are introduced into a part of the plastics melt which is free from excess pressure. After the glass fibers have been mixed into the melt, a strand is extruded and cut into granules no longer than 6 mm.

Although blockages and serious wear are avoided in this extruder-based process, the disadvantages mentioned above still occur because the granulate has to be remelted in an injection molding machine to produce individual moldings. The finished moldings only contain fiber debris with an average length of from 0.1 to 0.5 mm or, to a very minor extent, from 1 to 2 mm. The improvement in strength obtainable in this way is minimal, even if the fillings are added in quantities of up to 50% in practice. At the same time, surface quality deteriorates with increasing quantity, so that further expensive measures, for example secondary coatings, may have to be applied. In addition, in view of these small dimensions, adequate electromagnetic screening is only obtained with additions of 40% and more of conductive materials which, apart from poorer processibility and increased material costs, can lead to serious surface problems.

The object of the present invention is to provide a molding, including a simple, economic process for its production, which—through the incorporaion of only small quantities of solid fillings, shows greater strength, particularly against shattering, by comparison with the prior art and, if necessary, has a high electromagnetic screening capacity.

According to the invention, this object is achieved in that the shearing of the fillings of fiber-like, thread-like, ribbon-like and/or sheet-form materials and their incorporation into the plastic is intesified by means of a piston-like movement of the screw and the plastic is subsequently injected by means of a piston into a closed mold.

It is surprising to the expert that it is possible in an injection molding machine with a reciprocating screw and a narrow gap between the housing and the piston-like tip of the screw, on the one hand to avoid entanglement of the long fillings in one another without any jamming between the screw and its housing wall, despite the piston-like operation of the screw, and on the other hand to treat the fillings so carefully that a large percentage (>30%) of the fillings in the finished moldings have lengths of from 4 to 40 mm and, more particularly, from 10 to 30 mm, the fillings originally used having selected either from continuous filaments, rovings, ribbons, nets or even from individual fibers, chips or flakes. Another advantage is afforded by the process according to the invention insofar as the fillings cause only minimal wear, particularly by virtue of the very few ends in consequence of the greater length of the filling. In addition, the piston-like movement of the screw provides for thorough distribution of the fillings, so that the subsequent moldings show virtually isotropic behavior. In addition to this, there is the further advantage that, in the finished molding, the special properties of the fillings in regard to strength and screening are utilized over a greater length. The molding also shows improved surface quality by virtue of the smaller number of ends.

In one particular embodiment of the process, the gases given off during the process are maximally dissipated rearwards up to the inlet for the fillings and then outwards by the build-up of pressure through plug-like development of the plastic in the region of the screw tip.

Through the formation of a plug of the plastic material in the extruder, it is possible for any gases given off to be removed from the molten plastic against the direction in which it is being transported through partly filled screw threads and an opening which may be identical with the opening at which the fillings are introduced. A molding produced in this way thus contains considerably fewer bubbles than, for example, an extruded product.

In another embodiment of the process, part of the melt is moved during the piston-like movement through a gap between a screw tip provided with a piston and a housing.

In contrast to standard injection-molding machines, in which backflow is avoided by the backflow barrier, the shear forces generated by the backflow in the gap to divide the fillings into certain lengths, as a result of which the fillings can be straightened (in addition to the improved mixing effect), which can be of advantage in the case of static preferential directions of the moldings.

In another embodiment of the process, the piston-like movement in the main direction of transport of the plastics material is simultenously used for injection.

In the case of injection molding or blow molding, the process according to the invention may advantageously be carried out with a screw.

In one apparatus for carrying out the process for producing a plastics molding containing solid fillings, the screw with a plug-forming screw tip has an axial displacement drive and, looking in the direction of transport, is provided with a vent in front of or in the region of a feed inlet.

By means of the displacement drive, it is possible axially to displace the screw and thus to control the shearing and mixing process. At the same time, the plug-forming screw tip produces a rearwardly decreasing build-up or pressure which, when the screw threads are partly filled, provides for removal of the gases formed there through the vent, the vent generally being used at the same time for introducing the fillings.

In an improved apparatus, part of the screw tip is in the form of a piston.

By designing it as a simple piston, the screw tip may also be used, for example, for injection molding or blow molding. In this connection, it has been found to be of advantage not to incorporate any backflow barriers because the danger of blockages and wear is too great.

In one possible embodiment, feed is controlled by the displacement drive.

In order to avoid local concentrations in the melt due to the piston-like operation of the screw, a barrier coupled with the displacement drive may interrupt the introduction of fillings. At the same time, it is also possible in this way to control heating of the fillings to avoid any shock or wetting of the fillings by additives.

In one special molding produced by the process according to the invention, more than 30% by weight of the fillings have a minimum length of greater than 4 mm and, more particularly, of greater than 8 mm.

Contrary to existing opinion, namely that an injection molding should contain the shortest possible fiber fillings because of the danger of anisotropy, it has been found that it is precisely by long fillings that strength can be improved by 30 to 100%, even in cases where the moldings have very complicated geometry. Favorable results have been obtained with lengths of from 4 to 40 mm and, more particularly, with lengths of from 10 to 30 mm which, in fleece-like structures, generally transmit the forces within the fillings from one end of a filling to the other. The fillings may make up from 2 to 70% and, more particularly, from 5 to 20% of the total weight of the molding. The fillings may assume inter alia a fiber-like, thread-like, ribbon-like, sheet-like or net-like form. In addition, a more favorable surface is obtained because, with longer fillings, the number of ends is smaller and, at the same time, the quantity of fillings to be incorporated is smaller by virtue of better properties.

In one practicable embodiment, the fillings consist of organic and/or inorganic materials.

The ultimate strength properties of the molding may be greatly influenced by the choice of the constituent material of the fillings. Suitable filling materials are, for example, carbon, aramide, asbestos, metals, glass and other mineral fibers which may be embedded inter alia in thermoplasts, elastomers and resins.

In one embodiment worth mentioning, the fillings are at least partly electrically conductive. Where long conductive fibers and/or sheet-form materials (surface $\geq 36$ mm$^2$), for example of aluminium, are used, the required electrical screening effect can be obtained with concentrations as low as one sixth of the normal levels. In addition, an electromagnetic screening effect in the low-frequency range (<30 MHz) may be obtained where highly permeable materials are used.

In another embodiment the electrically conductive fillings are connected with one another as resistance wires.

By a network of long metal fibers—connected consecutively—there is an electrical resistance, which can be used for heating.

In one possible embodiment, the fillings act as supports for other additives.

Through these additives, which may consist of pigments, dyes, stabilizers and protective substances, it is possible additionally to obtain, for example, certain color effects or protective effects in the molding.

EXAMPLE 1

Distributor caps of polyamide-6,6 with an average wall thickness of 2 mm which had been produced on the one hand by the known process from granulate containing incorporated conductive fillings and, on the other hand, by the process according to the invention using pure granulate and metal rovings, are subjected to a comparitive investigation.

The result is shown in the following Table; the EMA was measured at a measuring frequency of 2.5 GHz (measurement of the electrical field component)

| EMA (dB) | Filler concentration known process (%) | Invention (%) |
| --- | --- | --- |
| 0 | 25.0 | 2.5 |
| 5 | 27.5 | 3.0 |
| 10 | 30.0 | 3.5 |
| 15 | 32.5 | 4.0 |
| 20 | 35.0 | 4.5 |
| 25 | 37.5 | 5.0 |
| 30 | 40.0 | 5.5 |
| 35 | 42.5 | 6.0 |
| 40 | 45.0 | 6.5 |
| 45 | 47.5 | 7.0 |
| 50 | 50.0 | 7.5 |

Comparison of the results shows that the process according to the invention requires a filler concentration of only about 6.5% to obtain an adequate screening effect (40 dB) whilst the conventional process requires 7 times that concentration, i.e. 45.0%.

Basically, mechanical behavior shows a similar constellation. For example, notched impact strength falls from around 30 kJ/m$^2$ in the conventional process (for a filler concentration of around 40% by weight), whereas it actually shows a slight increase in the process according to the invention.

EXAMPLE 2

A 4 mm thick injection molding of a polycarbonate (Makrolon) containing 20 percent of glass fibers has the following values:

|  | Reinforced granulate | | Granulate + Rovings | |
| --- | --- | --- | --- | --- |
|  | longitudinal | transverse | longitudinal | transverse |
| Tensile strength (MPa) | 82 | 59 | 95 | 82 |
| E-modulus (GPa) | 5 | 3.9 | 5.9 | 4.8 |
| Flexural strength (MPa) | 149 | 122 | 192 | 163 |
| Rupture (J) | 9.39 | 10.3 | 19.5 | 18.3 |

Comparison of the mechanical values shows that rigidity and breakage resistance are distinctly higher and less dependent on direction in moldings produced by the process according to the invention.

The strength reflected in double the energy absorption for impact stressing is particularly striking.

EXAMPLE 3

Production of heaters produced by injection molding using this new process. The polymer matrix used was a diurethane (PA 66). The conductive inner reinforcement consisted of 12% by weight of steel fibers (Bekinox 6.5μ).

An applied voltage of 30 V and a current of 0.5 A ($P = U \times J = 30 \text{ V} \times 0.5 \text{ A} = 15$ V) produces a surface temperature of 70° C.

We claim:

1. An injection molded plastic article containing solid fillings which consist essentially of lubricate-free fillings wherein more than 30% by weight of which have a minimum length of greater than 4 mm said fillings selected from the group consisting of carbon, aramide, asbestos, metal, glass and mineral fibers and said plastic article being produced by a process in which lubricant-free fillings are introduced into a screw in an injection molding apparatus in a region, where the plastic is in a plasticized form and the pressures are nearly the same, and are then incorporated by shearing, characterized in that shearing of the fillings of fiber-like, thread-like, ribbon-like or sheet-form materials and their incorporation into the plastic is intensified by a piston-like movement of the screw, after which the plastic is injected into a closed mold by means of a piston.

2. A molding as claimed in claim 1 wherein the fillings are at least partly electrically conductive.

3. A molding as claimed in claim 2, wherein the electrically conductive fillings are connected with one another as resistance wires.

* * * * *